(12) United States Patent
Gordon

(10) Patent No.: US 12,065,034 B2
(45) Date of Patent: Aug. 20, 2024

(54) REAR PORTAL GEAR ASSEMBLY FOR TRAILING ARMS

(71) Applicant: Robby Gordon, Charlotte, NC (US)

(72) Inventor: Robby Gordon, Charlotte, NC (US)

( * ) Notice: Subject to any disclaimer, the term of this patent is extended or adjusted under 35 U.S.C. 154(b) by 109 days.

(21) Appl. No.: 17/752,107

(22) Filed: May 24, 2022

(65) Prior Publication Data
US 2022/0371435 A1    Nov. 24, 2022

Related U.S. Application Data

(60) Provisional application No. 63/192,202, filed on May 24, 2021.

(51) Int. Cl.
| | |
|---|---|
| *B60K 17/04* | (2006.01) |
| *B60B 27/00* | (2006.01) |
| *B60G 7/00* | (2006.01) |
| *B62D 17/00* | (2006.01) |
| *F16H 1/06* | (2006.01) |
| *F16H 1/20* | (2006.01) |
| *F16H 57/02* | (2012.01) |
| *F16H 57/021* | (2012.01) |
| *F16H 57/025* | (2012.01) |
| *F16H 57/04* | (2010.01) |

(52) U.S. Cl.
CPC ............ *B60K 17/043* (2013.01); *B60G 7/001* (2013.01); *F16H 1/20* (2013.01); *F16H 57/025* (2013.01); *F16H 57/0408* (2013.01); *B60B 27/0015* (2013.01); *B62D 17/00* (2013.01); *F16H 1/06* (2013.01); *F16H 2057/02052* (2013.01); *F16H 2057/02056* (2013.01); *F16H 57/021* (2013.01); *F16H 57/0495* (2013.01)

(58) Field of Classification Search
CPC ............................ B60K 17/043; B60B 35/001
See application file for complete search history.

(56) References Cited

U.S. PATENT DOCUMENTS

| | | | | |
|---|---|---|---|---|
| 4,344,501 | A * | 8/1982 | Jerry ...................... | B60K 17/30 74/606 R |
| 6,095,005 | A * | 8/2000 | Tanzer ................. | B60K 17/043 475/225 |
| 10,889,182 | B1 * | 1/2021 | Lee ....................... | B60K 17/043 |
| 2021/0070354 | A1 * | 3/2021 | Eaton ..................... | B60G 7/001 |
| 2022/0332185 | A1 * | 10/2022 | Pultz .................... | B60K 17/046 |

FOREIGN PATENT DOCUMENTS

GB          1037040 A  *  7/1966

* cited by examiner

*Primary Examiner* — Jake Cook
(74) *Attorney, Agent, or Firm* — Barry Choobin; Patent 360

(57) ABSTRACT

A rear portal trailing arm assembly for a vehicle rear suspension that includes a CV joint hub for coupling with a transaxle and a wheel hub for coupling with a rear wheel. A gear transfer case extends rearward from the CV joint hub to an axle case and functions similarly to a rear trailing arm. Forward mounts facilitate coupling the gear transfer case to the chassis such that the trailing arm assembly pivots vertically with respect to the chassis. A rearward mount facilitates coupling a strut with the gear transfer case to control the vertical motion of the rear wheel. Multiple gear assemblies are meshed within the gear transfer case. An axle is coupled with the meshed gear assemblies and housed within the axle case, such that torque applied to the CV joint hub is communicated to the wheel hub.

12 Claims, 4 Drawing Sheets

REAR PORTAL GEAR ASSEMBLY FOR TRAILING ARMS

PRIORITY

This application claims the benefit of and priority to U.S. Provisional Application, entitled "Rear Portal Gear Assembly For Trailing Arms," filed on May 24, 2021, and having application Ser. No. 63/192,202, the entirety of said application being incorporated herein by reference.

FIELD

Embodiments of the present disclosure generally relate to vehicle suspension systems. More specifically, embodiments of the disclosure relate to an apparatus and methods for a rear portal gear assembly for trailing arms that is configured to improve the mechanical strength and performance of off-road drivetrains.

BACKGROUND

Off-road vehicles enjoy an enthusiastic following because of their many uses and versatility. As a result, several types of motorsports involve racing of various types of off-road vehicles. For example, competitions exist that are dedicated to various types of terrain, such as rally, desert racing, and rock-crawling. Besides their use in various motorsports, off-road vehicles commonly are used for sight-seeing and traveling to areas that may not be accessed by way of standard, paved roads.

The use of higher clearance, higher traction vehicles enables off-road vehicles to access trails and roads having rough, low traction surfaces that may not be traversed using a standard, on-road vehicle. As such, off-road vehicles typically comprise larger wheels, wider tires, and suspension configurations that are specifically engineered for use in off-road applications. As a consequence of such suspension configurations, as well as the rough terrain typically traversed, driver and passenger safety is a crucial concern. For example, drivers and passengers typically must be wear safety restraints during off-road travel. A wide variety of different types of safety harnesses are available for use with off-road vehicles.

Unlike on-road vehicles, such as passenger cars, off-road vehicles typically are open, often lacking windows, doors, and body panels common to passenger cars. A chassis comprising a structural arrangement of welded tubes typically is configured to support components of the off-road vehicle. For example, a front portion of the chassis is configured to support a front suspension of the off-road vehicle and various components of the off-road vehicle, such as a steering gear, a front differential, and the like. A rear portion of the chassis is configured to support a rear suspension of the off-road vehicle, such as rear trailing arms, as well as support various drivetrain components, such as a transaxle, a rear differential, an engine, and the like. Further, a roll cage or canopy comprising a welded tube structure coupled to the chassis is configured to protect the driver and passengers in the event of a rollover situation.

Trailing arm suspensions are well known and commonly used in off-road vehicles such as four-wheeled buggies. A typical trailing arm suspension comprises a trailing arm having one end pivotally connected to a vehicle frame or chassis through a frame bracket and another end connected to the vehicle frame by a spring or strut. The trailing arm supports an axle to which the vehicle wheels are mounted. Road-induced reaction forces acting on the wheels are controlled by the pivoting of the trailing arm in response to these forces, with the forces being resisted by the spring.

Given that off-road vehicles routinely travel over very rough terrain, such as mountainous regions, and are prone to tipping over, there is a desire to improve the mechanical strength, safety, convenience, and comfort of off-road vehicles, while at the same improving the performance of such vehicles.

SUMMARY

An apparatus and methods are provided for a rear portal trailing arm assembly for a vehicle rear suspension. The trailing arm assembly comprises a CV joint hub for coupling with a transaxle and a wheel hub for coupling with a rear wheel. A gear transfer case extends rearward from the CV joint hub to an axle case and functions similarly to a rear trailing arm. Forward mounts facilitate coupling the gear transfer case to the chassis such that the trailing arm assembly pivots vertically with respect to the chassis. A rearward mount facilitates coupling a strut with the gear transfer case to control the vertical motion of the rear wheel. Multiple gear assemblies are meshed within the gear transfer case. An axle is coupled with the meshed gear assemblies and housed within the axle case, such that torque applied to the CV joint hub is communicated to the wheel hub.

In an exemplary embodiment, a rear portal trailing arm assembly for a vehicle comprises: a CV joint hub for coupling with a transaxle; a gear transfer case extending rearward from the CV joint hub to an axle case; two or more meshed gear assemblies within the gear transfer case; an axle coupled with the two or more meshed gear assemblies and housed within the axle case; and a wheel hub for coupling with a rear wheel.

In another exemplary embodiment, the trailing arm assembly is configured for use with rear-engine drivetrains wherein a transaxle is positioned forward of the engine. In another exemplary embodiment, the CV joint hub is disposed near a front of the gear transfer case. In another exemplary embodiment, the axle case is disposed near a rear of the gear transfer case. In another exemplary embodiment, the axle is supported within the axle case by way of suitable bearings.

In another exemplary embodiment, the two or more meshed gear assemblies are configured to communicate torque from the CV joint hub to the wheel hub. In another exemplary embodiment, the two or more meshed gear assemblies comprises five gear assemblies incorporated into the gear transfer case such that the CV joint hub and the wheel hub share the same direction of rotation. In another exemplary embodiment, the wheel hub includes multiple wheel studs for fastening a rear wheel onto the wheel hub. In another exemplary embodiment, the gear transfer case includes a lubrication fill port configured to facilitate filling the gear transfer case with a suitable quantity of gear oil or other suitable lubricant. In another exemplary embodiment, a drain plug is incorporated into the gear transfer case to enable periodic replacement of the suitable lubricant. In another exemplary embodiment, the axle case include a drain plug and a fill port for replacing a lubricant within the axle case.

In another exemplary embodiment, the gear transfer case comprises a generally rigid member configured to function similarly to a rear trailing arm. In another exemplary embodiment, the gear transfer case is configured to be hingedly coupled to the chassis, such that the gear transfer case allows for vertical motion of the rear wheel during operation of the vehicle. In another exemplary embodiment, the gear transfer case includes forward mounts and a rearward strut mount. In another exemplary embodiment, the forward mounts facilitate coupling the gear transfer case to the chassis such that the trailing arm assembly pivots vertically with respect to the chassis. In another exemplary embodiment, the rearward strut mount is configured to couple a suitable strut with the gear transfer case to control the vertical motion of the rear wheel.

In an exemplary embodiment, a rear portal trailing arm assembly for a vehicle comprises: a trailing arm for coupling a rear wheel with a chassis; an inboard case disposed at an end of the trailing arm; an outboard case for fastening to the inboard case to enclose an interior cavity; a pinion gear assembly disposed in the interior cavity and coupled with a drive axle; and an output gear assembly meshed with the pinion gear assembly and coupled with a wheel hub.

In another exemplary embodiment, the pinion gear assembly and the output gear assembly are configured to communicate torque applied to the drive axle to the wheel hub. In another exemplary embodiment, the pinion gear assembly is configured to be coupled with an adapter and a protective boot that facilitate coupling an outboard constant velocity joint with the pinion gear assembly. In another exemplary embodiment, the pinion gear assembly and the output gear assembly share an intervening angle that facilitates configuring a suspension geometry that provides a camber change of the rear wheel that substantially eliminates a change in track width during vertical motion of the trailing arm assembly due to terrain.

These and other features of the concepts provided herein may be better understood with reference to the drawings, description, and appended claims.

BRIEF DESCRIPTION OF THE DRAWINGS

The drawings refer to embodiments of the present disclosure in which.

Figure 1:
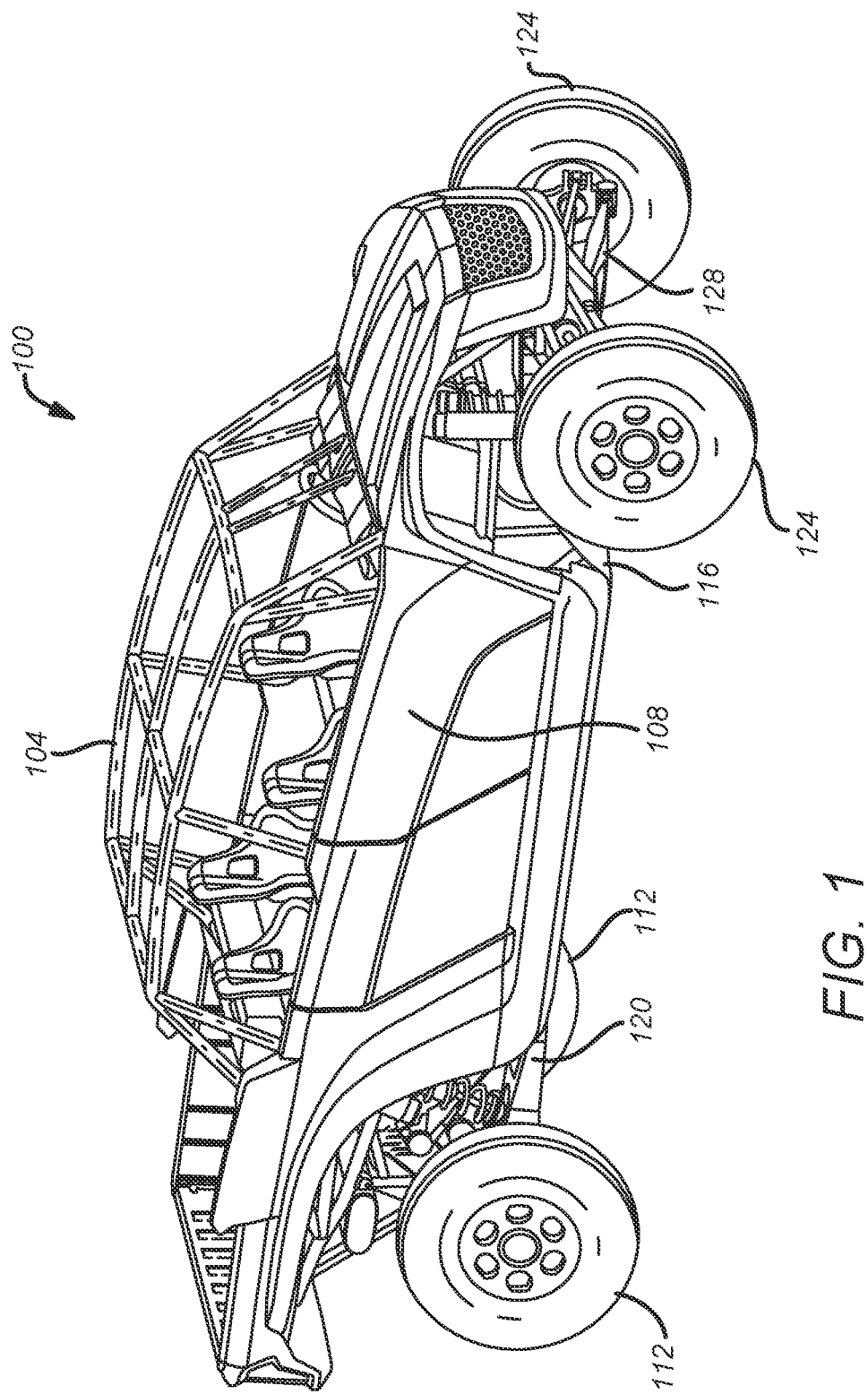
FIG. 1 illustrates an exemplary embodiment of an off-road vehicle that is configured to seat up to four occupants and includes rear suspension trailing arms in accordance with the present disclosure.

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the rear portal trailing arm assembly and methods disclosed herein may be practiced without these specific details. In other instances, specific numeric references such as "first hinge," may be made. However, the specific numeric reference should not be interpreted as a literal sequential order but rather interpreted that the "first hinge" is different than a "second hinge." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

Trailing arm suspensions are well known and commonly used in off-road vehicles such as four-wheeled buggies. A typical trailing arm suspension comprises a trailing arm having one end pivotally connected to a vehicle frame or chassis through a frame bracket and another end connected to the vehicle frame by a spring or strut. The trailing arm supports an axle to which the vehicle wheels are mounted. Road-induced reaction forces acting on the wheels are controlled by the pivoting of the trailing arm in response to these forces, with the forces being resisted by the spring. Given that off-road vehicles routinely travel over very rough terrain, such as mountainous regions, and are prone to tipping over, there is a desire to improve the mechanical strength, safety, convenience, and comfort of off-road vehicles, while at the same improving the performance of such vehicles. Embodiments disclosed herein provide an apparatus and methods for a rear portal gear assembly for trailing arms that is configured to improve the mechanical strength and performance of off-road drivetrains.

Figure 2:
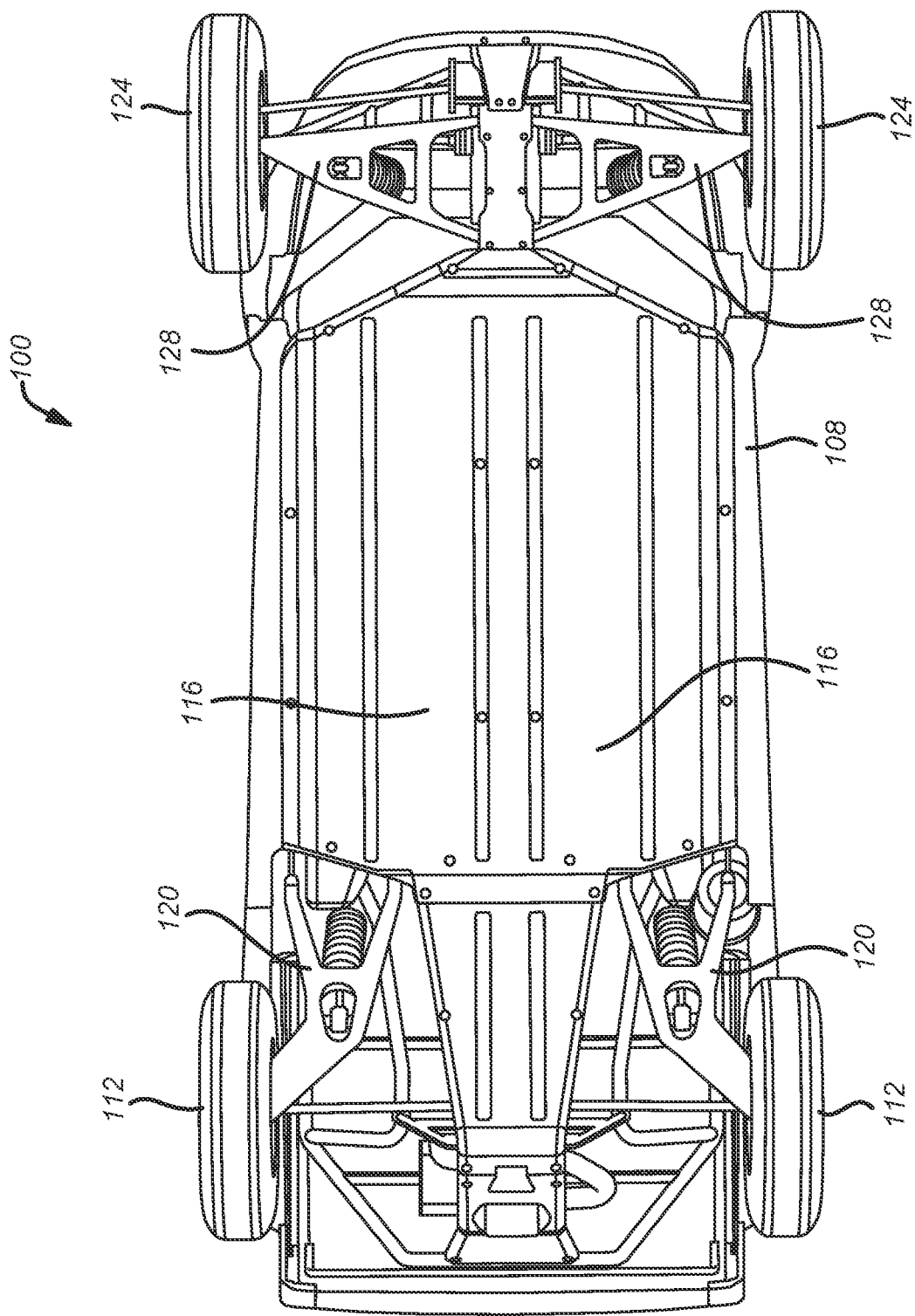
FIG. 2 illustrates a bottom view of an exemplary embodiment of an off-road vehicle that includes rear suspension trailing arms according to the present disclosure.

FIGS. 1-2 illustrate an exemplary embodiment of an off-road vehicle 100 that is particularly suitable for implementation of rear portal trailing arms in accordance with the present disclosure. As disclosed hereinabove, the off-road vehicle 100 generally is of a Utility Task Vehicle (UTV) variety that seats up to four occupants, includes a roll-over protection system 104, and may have a cab enclosure 108. As best shown in FIG. 2, rear wheels 112 of the off-road vehicle 100 are operably coupled with a chassis 116 by way of rear suspension trailing arms 120. Front wheels 124 are operably coupled with the chassis 116 by way of a front suspension system 128. It should be understood, however, that the rear suspension trailing arms 120 disclosed herein are not to be limited to the specific off-road vehicle 100 shown in FIG. 1, but rather the rear suspension trailing arms 120 may be incorporated into a wide variety of vehicles, other than the off-road vehicle 100 of FIG. 1, without limitation.

As will be recognized by those skilled in the art, the rear wheel 112 generally is fastened to the rear suspension trailing arm 120 by way of a wheel hub (not shown). Preferably, the wheel hub is rotatably attached to the rear suspension trailing arm 120 by way of one or more suitably sized roller bearings. As will be further recognized, the rear wheel 112 and wheel hub generally are driven by way of a constant velocity (CV) joint configured to convey torque from an engine of the vehicle.

Moreover, although the rear suspension trailing arm 120 illustrated and described herein is best suited for use in a rear suspension of a vehicle, it is contemplated that the trailing arm 120 is not to be limited to rear suspensions, but rather in some embodiments, the trailing arm 120 may be configured for use in a front suspension of a vehicle, without limitation, and without deviating beyond the spirit and scope of the present disclosure. For the sake of brevity, however, the trailing arm 120 is hereinafter discussed in connection with a rear suspension of a vehicle. As such, terms conveying a relative positioning of components or portions comprising the trailing arm 120, such as "forward," "rearward," "back," "front," "proximal," and "distal," should not be construed as limiting in nature, but rather such terms should be understood merely as tools used to convey the details of the invention to those of ordinary skill in the art.

Figure 3:
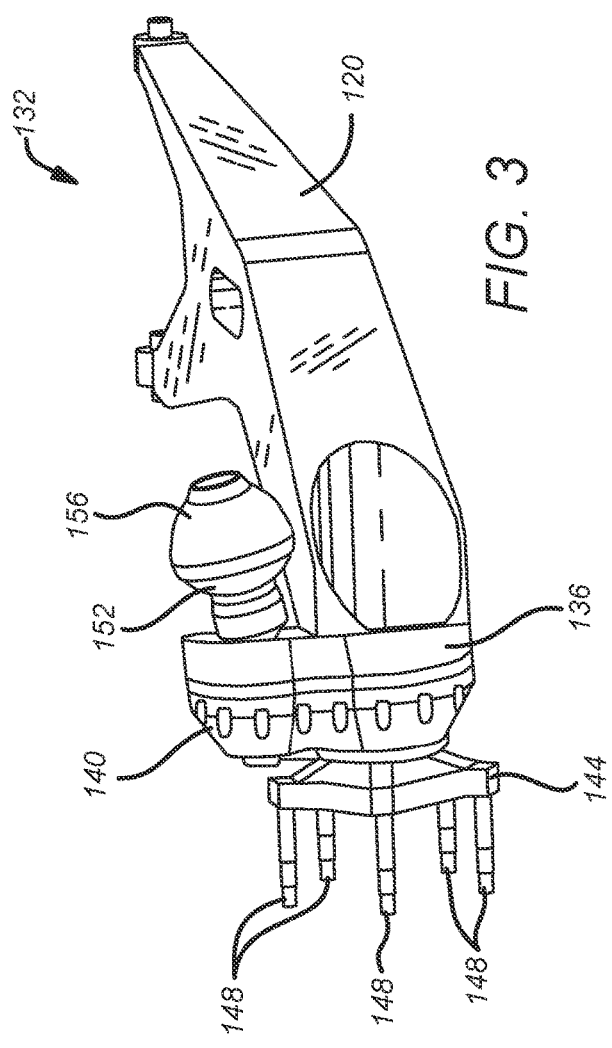
FIG. 3 illustrates an exemplary embodiment of a rear portal trailing arm assembly in accordance with the present disclosure.

Turning, now, to FIG. 3, a rear view of an exemplary embodiment of a rear portal trailing arm assembly 132 (hereinafter, "trailing arm assembly 132") is shown in accordance with the present disclosure. The trailing arm assembly 132 is configured to couple a rear wheel 112 with a driver-side of the off-road vehicle 100. The trailing arm assembly 132 includes a trailing arm 120 and an inboard case 136 that are coupled with an outboard case 140. The inboard case 136 and the outboard case 140 cooperate to enclose a pinion gear assembly 160 and an output gear assembly 164 that are configured to communicate torque from a transaxle onboard the vehicle 100 to the rear wheel 112 (see FIG. 1). A wheel hub 144 and multiple wheel studs 148 facilitate coupling the rear wheel 112 with the output gear assembly. The pinion gear assembly 160 and the output gear assembly 164 are discussed in greater detail in U.S. patent application, entitled "Front Portal Spindle Assembly," filed on Aug. 21, 2020 and having application Ser. No. 17/000,075, the entirety of said application being incorporated herein by reference.

Figure 4:
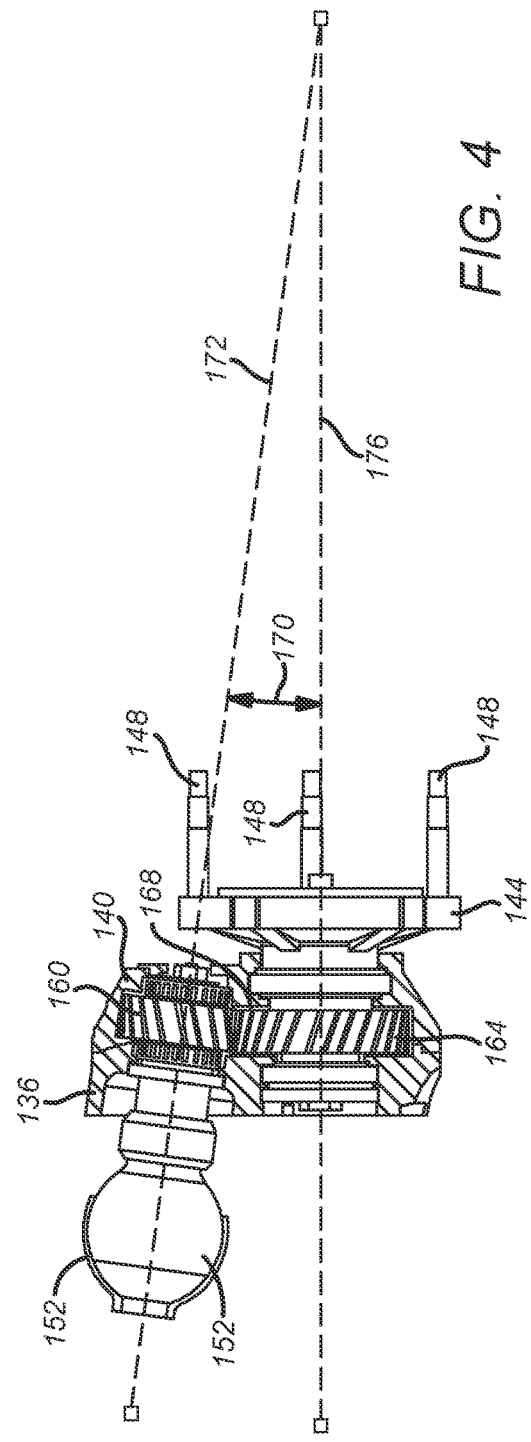
FIG. 4 illustrates a cross-sectional view of an exemplary embodiment of a rear portal trailing arm assembly, taken along a midline.

As shown in FIG. 4, the inboard case 136 and the outboard case 140 cooperate to house the pinion and output gear assembles 160, 164 within an interior cavity 168, such that the pinion and output gear assembles 160, 164 are meshed within the interior cavity 168. As such, torque applied to the pinion gear assembly 160 is ultimately communicated to the rear wheel 112 (see FIG. 1) coupled with the output gear assembly 164. The pinion gear assembly 160 is configured to be engaged with an outboard constant velocity joint (not shown) for communicating torque from a transaxle onboard the vehicle 100 to the pinion gear assembly 160. An adapter 152 and a protective boot 156 are configured to facilitate coupling the outboard constant velocity joint with the pinion gear assembly 160.

Moreover, the pinion and output gear assembles 160, 164 incorporated into the trailing arm assembly 132 generally share an angle, such as an angle 170 as shown in FIG. 4. The pinion gear assembly 160 is longitudinally aligned along a pinion axis 172 that is disposed at an angle 170 relative to a hub axis 176 with which the output gear assembly 164 is longitudinally aligned. It is contemplated that the angle 170 may be configured to orient the pinion gear assembly 160 and the outboard constant velocity joint toward the transaxle. Experimental observation has shown that an angle 170 generally ranging between substantially 1-degree and 25-degrees facilitates configuring a suspension geometry that provides a camber change of the rear wheel 112 that substantially eliminates a change in track width during vertical motion of the trailing arm assembly 132 due to terrain. More specifically, experimental observation has demonstrated that an angle 170 ranging between substantially 1-degree and 15-degrees provides an optimal camber change of the rear wheel 112 that eliminates a change in track width and prevents exceeding an articulation angle of the constant velocity joints during vertical motion of the trailing arm assembly 132 due to terrain.

Figure 5:
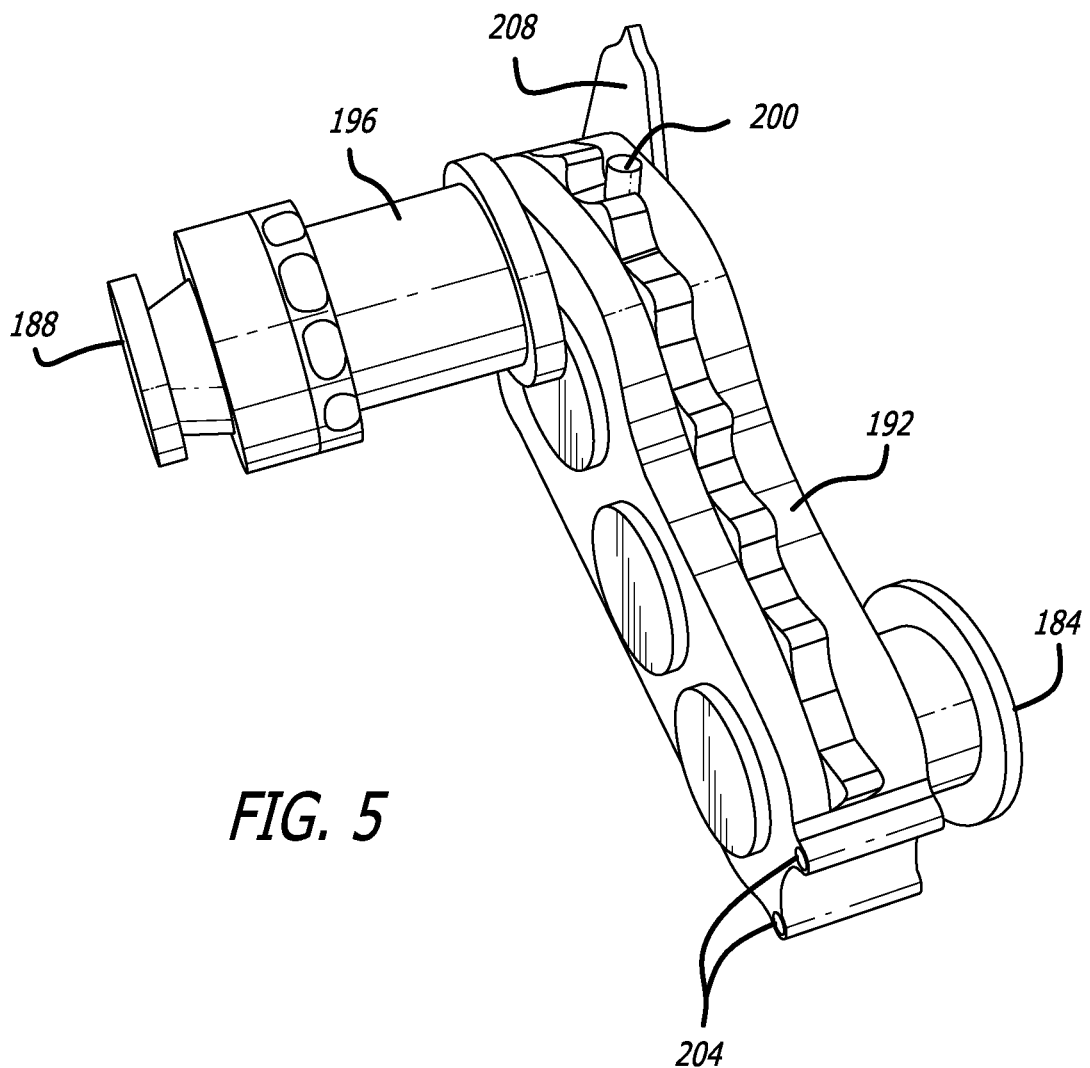
FIG. 5 illustrates a front perspective view of an exemplary embodiment of a rear portal trailing arm assembly according to the present disclosure.

FIG. 5 illustrates a front perspective view of an exemplary embodiment of a rear portal trailing arm assembly 180 (hereinafter, "trailing arm assembly 180") according to the present disclosure. Unlike the trailing arm assembly 132 of FIG. 3, the trailing arm assembly 180 is configured for use with rear-engine drivetrains wherein a transaxle is positioned forward of the engine. As such, the trailing arm assembly 180 comprises a CV joint hub 184 disposed near a front of the trailing arm assembly 180 and a wheel hub 188 disposed near the rear of the trailing arm assembly 180. The CV joint hub 184 is configured to be coupled with a transaxle by way of a CV joint and a drive axle. The wheel hub 188 may be similar to the wheel hub 144, discussed in connection with FIG. 3, and thus may include multiple wheel studs 148 whereby a rear wheel 112 may be fastened onto the wheel hub 188.

As shown in FIG. 5, a gear transfer case 192 and an axle case 196 join the CV joint hub 184 and the wheel hub 188. The axle case 196 may house an axle that communicates torque from the gear transfer case 192 to the wheel hub 188 as well as including suitable bearings for supporting the axle. The gear transfer case 192 may include two or more meshed gear assemblies whereby torque is transferred from the CV joint hub 184 to the wheel hub 144. It is contemplated that the gear assemblies comprising the trailing arm assembly 180 may be substantially similar to the pinion and output gear assembles 160, 164 incorporated into the trailing arm assembly 132. Details pertaining to gear assemblies suitable for incorporation into the gear transfer case 192 may be found in above-referenced U.S. patent application having application Ser. No. 17/000,075.

Moreover, it is contemplated that any number of meshed gear assemblies may be incorporated into the gear transfer case 192, without limitation. In one embodiment, for example, five gear assemblies are incorporated into the gear transfer case 192 such that the CV joint hub 184 and the wheel hub 188 share the same direction of rotation. In some embodiments, the trailing arm assembly 180 may include more than or less than five gear assemblies, as desired. Further, the gear transfer case 192 includes a lubrication fill port 200 configured to facilitate filling the gear transfer case 192 with a suitable quantity of gear oil or other suitable lubricant. It is contemplated that a drain plug (not shown) may be incorporated into the gear transfer case 192 for the purpose of periodically replacing the lubricant inside the gear transfer case 192. Further, the axle case 196 may include a drain plug and a fill port for replacing a lubricant within the axle case 196.

As will be appreciated, the gear transfer case 192 is a generally rigid member, and thus the gear transfer case 192 may function similarly to a rear trailing arm, such as the trailing arm 120 discussed hereinabove. As such, the trailing arm assembly 180 may be hingedly coupled to the chassis 116 such that the gear transfer case 192 allows for vertical motion of the rear wheel 112 during operation of the vehicle 100. In the illustrated embodiment, the gear transfer case 192 includes forward mounts 204 and a rearward strut mount 208. The forward mounts 204 facilitate coupling the trailing arm assembly 180 to the chassis 180 such that the trailing arm assembly 180 may pivot vertically with respect to the chassis 116. The rearward strut mount 208 is configured to facilitate coupling a suitable strut with the trailing arm assembly 180 to control the vertical motion of the rear wheel 112.

While the rear portal trailing arm assembly and methods have been described in terms of particular variations and illustrative figures, those of ordinary skill in the art will recognize that the rear portal trailing arm assembly is not limited to the variations or figures described. In addition, where methods and steps described above indicate certain events occurring in certain order, those of ordinary skill in the art will recognize that the ordering of certain steps may be modified and that such modifications are in accordance with the variations of the rear portal trailing arm assembly. Additionally, certain of the steps may be performed concurrently in a parallel process, when possible, as well as performed sequentially as described above. To the extent there are variations of the rear portal trailing arm assembly, which are within the spirit of the disclosure or equivalent to the rear portal trailing arm assembly found in the claims, it is the intent that this patent will cover those variations as well. Therefore, the present disclosure is to be understood as not limited by the specific embodiments described herein, but only by scope of the appended claims.

What is claimed is:

1. A rear portal trailing arm assembly for a vehicle, comprising:
    a CV joint hub for coupling with a transaxle;
    a gear transfer case having a proximal end and a distal end, the CV joint hub disposed at the proximal end of the gear transfer case,
    an axle case disposed at the distal end of the gear transfer case;
    two or more meshed gear assemblies disposed within the gear transfer case;
    an axle coupled to a first gear of the two or more meshed gear assemblies, the axle housed within the axle case, wherein the CV joint hub is coupled to a second gear of the two or more meshed gear assemblies;
    a wheel hub for coupling with a rear wheel;
    a plurality of forward mounts disposed at the proximal end of the gear transfer case, the plurality of forward mounts are integral with the gear transfer case, the plurality of forward mounts configured to couple to a chassis of the vehicle such that the trailing arm assembly pivots vertically with respect to the chassis; and
    a rearward strut mount disposed at the distal end of the gear transfer case, wherein the rearward strut mount is configured to couple to a strut of the vehicle to control a vertical motion of the rear wheel.

2. The trailing arm assembly of claim 1, wherein the trailing arm assembly is configured for use with rear-engine drivetrains wherein a transaxle is positioned forward of the engine.

3. The trailing arm assembly of claim 1, wherein the axle is mounted within the axle case by way of bearings.

4. The trailing arm assembly of claim 1, wherein the two or more meshed gear assemblies are configured to communicate torque from the CV joint hub to the wheel hub.

5. The trailing arm assembly of claim 1, wherein the two or more meshed gear assemblies comprise five gear assemblies incorporated into the gear transfer case such that the CV joint hub and the wheel hub share the same direction of rotation.

6. The trailing arm assembly of claim 1, wherein the wheel hub comprises a plurality of wheel studs for fastening the rear wheel onto the wheel hub.

7. The trailing arm assembly of claim 1, wherein the gear transfer case comprises a lubrication fill port configured to facilitate filling the gear transfer case with a lubricant.

8. The trailing arm assembly of claim 7, wherein a drain plug is incorporated into the gear transfer case to enable periodic replacement of the lubricant.

9. The trailing arm assembly of claim 8, wherein the axle case comprises a drain plug and a fill port, the fill for filling a lubricant into the axle case, and the drain port for draining the filled lubricant from the axle case.

10. A rear portal trailing arm assembly for a vehicle, comprising:
    a trailing arm for coupling a rear wheel with a chassis;
    an inboard case disposed at an end of the trailing arm;
    an outboard case for fastening to the inboard case to enclose an interior cavity;
    a pinion gear assembly disposed in the interior cavity and coupled with a drive axle, the pinion gear assembly is longitudinally aligned along a pinion axis; and
    an output gear assembly meshed with the pinion gear assembly and coupled with a wheel hub, the output gear assembly is longitudinally aligned along a hub axis, wherein the pinion axis is disposed at an angle relative to the hub axis, wherein the angle ranges from 1-25 degrees.

11. The trailing arm assembly of claim 10, wherein the pinion gear assembly and the output gear assembly are configured to communicate torque applied to the drive axle to the wheel hub.

12. The trailing arm assembly of claim 10, wherein the pinion gear assembly is configured to be coupled with an adapter and a protective boot that facilitate coupling an outboard constant velocity joint with the pinion gear assembly.

* * * * *